United States Patent
Tabony et al.

(10) Patent No.: US 10,055,227 B2
(45) Date of Patent: Aug. 21, 2018

(54) USING THE LEAST SIGNIFICANT BITS OF A CALLED FUNCTION'S ADDRESS TO SWITCH PROCESSOR MODES

(71) Applicant: QUALCOMM Incorporated, San Diego, CA (US)

(72) Inventors: Charles Joseph Tabony, Austin, TX (US); Erich James Plondke, Austin, TX (US); Lucian Codrescu, Austin, TX (US); Suresh K. Venkumahanti, Austin, TX (US); Evandro Carlos Menezes, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1371 days.

(21) Appl. No.: 13/655,499

(22) Filed: Oct. 19, 2012

(65) Prior Publication Data

US 2013/0205115 A1     Aug. 8, 2013

Related U.S. Application Data

(60) Provisional application No. 61/595,773, filed on Feb. 7, 2012.

(51) Int. Cl.
    *G06F 9/30*      (2006.01)
    *G06F 9/38*      (2018.01)
    *G06F 9/32*      (2018.01)

(52) U.S. Cl.
    CPC ...... *G06F 9/30189* (2013.01); *G06F 9/30054* (2013.01); *G06F 9/30076* (2013.01);
(Continued)

(58) Field of Classification Search
    CPC .................................................. G06F 9/30189
(Continued)

(56) References Cited

U.S. PATENT DOCUMENTS 6,189,090 B1 *   2/2001   Tan et al. ...................... 712/229
6,209,079 B1     3/2001   Otani et al.
(Continued)

FOREIGN PATENT DOCUMENTS

CN     1177140 A     3/1998
EP     1065586 A2     1/2001
(Continued)

OTHER PUBLICATIONS

International Search Report and Written Opinion—PCT/US2013/025187—ISA/EPO—dated May 2, 2013.

*Primary Examiner* — Aimee Li
*Assistant Examiner* — Michael Metzger
(74) *Attorney, Agent, or Firm* — Muncy, Geissler, Olds & Lowe, P.C.

(57) ABSTRACT

Systems and methods for tracking and switching between execution modes in processing systems. A processing system is configured to execute instructions in at least two instruction execution triodes including a first and second execution mode chosen from a classic/aligned mode and a compressed/unaligned mode. Target addresses of selected instructions such as calls and returns are forcibly misaligned in the compressed mode, such one or more bits, such as, the least significant bits (alignment bits) of the target address in the compressed mode are different from the corresponding alignment bits in the classic mode. When the selected instructions are encountered during execution in the first mode, a decision to switch operation to the second mode is based on analyzing the alignment bits of the target address of the selected instruction.

23 Claims, 6 Drawing Sheets

(52) U.S. Cl.
CPC ...... *G06F 9/30149* (2013.01); *G06F 9/30181* (2013.01); *G06F 9/322* (2013.01); *G06F 9/3816* (2013.01)

(58) Field of Classification Search
USPC .......................................................... 712/229
See application file for complete search history.

(56) References Cited

U.S. PATENT DOCUMENTS

| | | | |
|---|---|---|---|
| 6,449,712 B1* | 9/2002 | Irie et al. | 712/227 |
| 6,496,922 B1 | 12/2002 | Borrill | |
| 6,654,874 B1* | 11/2003 | Lee | 712/209 |
| 6,675,290 B1* | 1/2004 | Miyamori | 712/229 |
| 7,065,633 B1 | 6/2006 | Yates, Jr. et al. | |
| 7,093,108 B2* | 8/2006 | Swaine | 712/227 |
| 7,376,812 B1 | 5/2008 | Sanghavi et al. | |
| 7,421,568 B2 | 9/2008 | Stempel et al. | |
| 7,711,927 B2* | 5/2010 | Sartorius et al. | 712/213 |
| 7,865,699 B2 | 1/2011 | Altman et al. | |
| 2005/0144427 A1* | 6/2005 | Col et al. | 712/242 |
| 2005/0262329 A1* | 11/2005 | Krishnan et al. | 712/210 |
| 2006/0174089 A1 | 8/2006 | Altman et al. | |
| 2007/0204134 A1* | 8/2007 | Webber | 712/209 |
| 2010/0312991 A1* | 12/2010 | Norden et al. | 712/205 |

FOREIGN PATENT DOCUMENTS

| | | |
|---|---|---|
| GB | 2374694 | 10/2002 |
| GB | 2435116 A | 8/2007 |
| JP | H1097421 A | 4/1998 |
| JP | 2001142692 A | 5/2001 |
| JP | 3442100 B2 | 9/2003 |
| JP | 2010503107 A | 1/2010 |
| WO | 2009137108 A1 | 11/2009 |

* cited by examiner

USING THE LEAST SIGNIFICANT BITS OF A CALLED FUNCTION'S ADDRESS TO SWITCH PROCESSOR MODES

CLAIM OF PRIORITY UNDER 35 U.S.C. § 119

The present application for patent claims priority to Provisional Application No. 61/595,773, entitled "USING THE LEAST SIGNIFICANT BITS OF A CALLED FUNCTION'S ADDRESS TO SWITCH PROCESSOR MODES", filed Feb. 7, 2012, and assigned to the assignee hereof and hereby expressly incorporated by reference herein.

FIELD OF DISCLOSURE

Disclosed embodiments relate to switching between execution modes in processing systems. More particularly, exemplary embodiments are directed to processing systems comprising at least two instruction modes and techniques for switching between the at least two instruction modes using one or more least significant bits of addresses of called functions.

BACKGROUND

Processors are often configured to support multiple execution modes. For example, a first execution mode may comprise instructions of fixed-width, while a second execution mode may support variable-width instructions. A common address space may be shared between instructions in each mode, such that a same address or program counter (PC) value may point to a first instruction if the processor is in the first execution mode or to a second instruction if the processor is in the second execution mode. Because the processor may be capable of switching between the two modes, it becomes necessary to track the execution mode to ascertain which one of the two instructions is addressed by a current PC value, and thus ensure that instructions are being executed correctly.

With reference to a known ARM processor, an ARM mode supports fixed-width (32-bit) instructions, while a THUMB mode supports variable-width (16-bit and 32-bit) instructions. A common address space in a byte-addressable memory may comprise instructions in both ARM and THUMB modes. However, alignment of instructions in the two modes may be different. For example, ARM mode instructions may be aligned at 32-bit boundaries, such that the two least significant address bits for the ARM mode instruction will always be "00". On the other hand, THUMB mode instructions may be aligned at either 16-bit or 32-bit boundaries, such that the two least significant address bits for the THUMB mode instructions may be "10" or "00." Thus, knowing the address alone is insufficient to conclusively determine which one of the two modes, ARM or THUMB, is currently being executed.

In order to track which mode is being executed, ARM processors adopt an approach which includes storing a mode bit in the least significant bit (LSB) of the PC. The LSB of the PC in THUMB mode may be a reserved bit because as noted above the two least significant address bits are either "10" or "00" and thus the LSB (which is "0" in both cases) may be used to store a mode bit. Execution may switch between the ARM mode and the THUMB mode on function calls, such as a jump instruction. Thus, if a jump instruction transfers execution to a function comprising instructions in THUMB mode, then the ARM processor implements this change in modes to THUMB mode by jumping to the address of the function +1. In this manner, the value of the two least significant bits in the THUMB mode are either "11" or "01," thereby distinguishing them from the "00" value of the two least significant bits in the ARM mode.

While the above approach adopted by ARM processors accomplishes the objective of tracking execution modes, it suffers from corresponding limitations. For example, addition of "1" is required as noted above for every jump to THUMB mode. This complicates the software, and particularly the linker. The linker has to determine the mode of each function and then choose between a regular call and a mode switching call for all calls to each function. Additionally, the debugger is also affected because the debugger would need to keep track of functions being called from within the debugger to determine whether these functions are ARM or THUMB functions in order to determine whether to jump to the PC value of the function or to jump to the PC value of the function +1 respectively.

Yet another drawback associated with the above approach arises from using the LSB of the PC to store the mode bit. Because the LSB is used to represent the mode, the LSB is no longer a part of the actual address. Therefore, if the ARM processor were to include 8-bit and 24-bit instructions to THUMB mode, the starting point of every function in THUMB mode would still be required to be 16-bit aligned in order to facilitate mode tracking. This would entail requiring about half of all the functions to introduce an 8-bit no-operation instruction (nop) before the start of the functions in order to align the first instruction in the function to a 16-bit boundary.

Other known processor architectures, such as MIPS and PowerPC face similar challenges related to switching between execution modes and adopt similarly disadvantaged methods to handle these challenges. Correspondingly, the existing architectures exhibit drawbacks in their approaches to track and switch between execution modes. For example, some approaches involve using the PC value of an instruction stored in an associated memory management unit (MMU) to determine the execution mode for the instruction because any page in the MMU can belong to either mode. A drawback in terms of increased hardware cost of using a page attribute to determine the mode is that the mode bit takes up additional room in the page table entry, of the MMU, and conventional page table entries are constrained in their size. Drawbacks in terms of software costs of using a page attribute to determine the mode include, complicating the loader, which would have to determine which mode a page is supposed to be in and then fill in the appropriate bit in the page table entry for that page. Further, the debugger would have to look up the entry in the page table for a particular page before it can disassemble instructions in that page. Similarly deficient are other known approaches that include specific program code for determining the mode associated with addresses using reserved operation code (OpCode) bits.

Accordingly, there is a corresponding need in the art to overcome drawbacks of aforementioned approaches for tracking and switching between execution modes.

SUMMARY

Exemplary embodiments of the invention are directed to systems and method for switching between execution modes in processing systems. More particularly, exemplary embodiments are directed to processing systems comprising at least two instruction modes, a classic/aligned mode and a compressed/unaligned mode, and switching between the at least two instruction modes using one or more least significant bits of addresses of called functions.

For example, an exemplary embodiment is directed to a method of switching between execution modes in a processor, the method comprising: detecting a first instruction when the processor is operating in a first execution mode, analyzing one or more bits a target address of the first instruction, and determining whether to switch operation of the processor from the first execution mode to a second execution mode based on the one or more bits.

Another exemplary embodiment is directed to an apparatus comprising: a processor configured to execute instructions in at least two execution modes including a first execution mode and a second execution mode, logic configured to detect a first instruction during execution in the first execution mode, logic configured to analyze one or more bits of a target address of the first instruction, and logic configured to determine whether to switch operation of the processor from the first execution mode to the second execution mode based on the one or more bits.

Yet another exemplary embodiment is directed to a processing system comprising: means for executing instructions in at least two execution modes including a first execution mode and a second execution mode, means for detecting a first instruction during execution in the first execution mode, means for analyzing one or more bits of a target address of the first instruction, and means for determining whether to switch operation of the processor from the first execution mode to the second execution mode based on the one or more bits.

Another exemplary embodiment is directed to a non-transitory computer-readable storage medium comprising code, which, when executed by a processor, causes the processor to perform operations for switching between execution modes of the processor, the non-transitory computer-readable storage medium comprising: code for detecting a first instruction when the processor is operating in a first execution mode, code for analyzing one or more bits a target address of the first instruction, and code for determining whether to switch operation of the processor from the first execution mode to a second execution mode based on the one or more bits.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
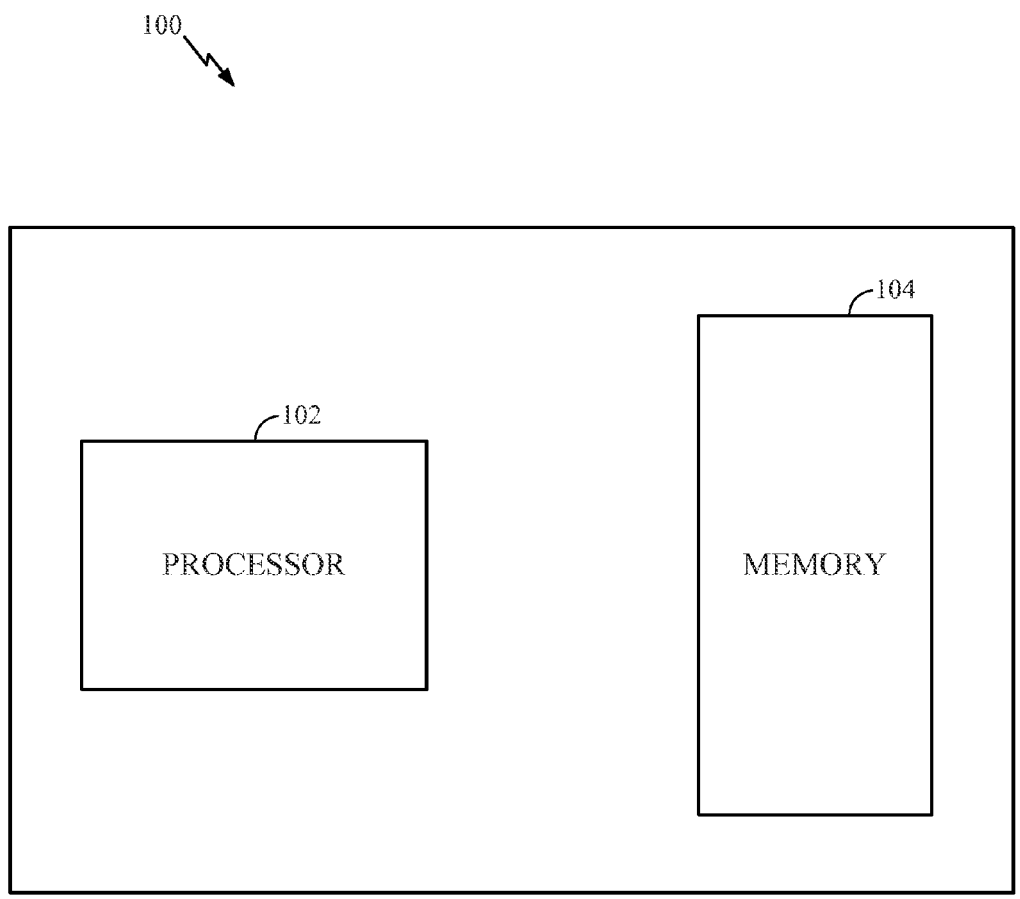
FIG. 1 is a simplified schematic of a processing system configured according to exemplary embodiments.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments include techniques for tracking and switching between execution modes, while avoiding drawbacks associated with existing approaches. One embodiment may include at least two execution modes, wherein the execution modes may be defined with regard to the respective alignment of instructions within the modes. Reference to alignment of instructions is generally made with respect to 32-bits (or 4-bytes) of memory address space, but this shall not be construed as a limitation. Disclosed techniques ma be easily extended to other memory address boundaries without departing from the scope of the present disclosure.

Accordingly, in a first execution mode, instructions may be allowed to be unaligned/misaligned or arbitrarily aligned without restrictions. This first execution mode will be referred to herein as a "compressed" mode. In a second execution mode, alignment of instructions may be restrained to specified boundaries in a corresponding memory address space, such as a 32-bit boundary. This second execution mode will be referred to herein as a "classic" mode.

With reference now to FIG. 1, there is shown a simplified schematic of an exemplary processing system 100. Processing system 100 is shown to comprise processor 102 coupled to memory 104. While not illustrated, processing system 100 may comprise various other components such as one or more instruction and/or data caches, I/O devices, coprocessors, etc as are well known in the art. Memory 104 may be byte-addressable and comprise instructions which may be unaligned, or aligned at 32-bit boundaries (i.e. both instructions in compressed mode and classic mode respectively). Processor 102 may be configured to execute instructions in the classic mode as well as the compressed mode.

In a non-limiting exemplary embodiment, instructions in the classic mode may be aligned to a 32-bit boundary in memory 104, thus mandating the two least significant bits of addresses of each and every instruction in the classic mode to have the value "00." Further, in this embodiment, selected instructions in the compressed mode may be forcibly misaligned such that the two least significant bits of addresses of the selected instructions have a non-zero value, i.e. any value other than "00" (e.g. the two least significant bits of addresses of the selected instructions may be forced to be of value "01," "10," or "11"). Accordingly, these least significant bits of addresses may be indicative of alignment and may be referred to herein as "alignment bits."

The selected instructions in the compressed mode which are forcibly misaligned may correspond to entry points. For example, entry points may mark the beginning of a function comprising instructions in the compressed mode; entry points may be instructions following calls from the compressed mode; or entry points may mark the beginning of exception/interrupt handlers. Regardless of the precise nature of the entry points, the selected instructions which may trigger a switch from execution in the classic mode to execution in the compressed mode may be forcibly misaligned. Alignment of all remaining instructions, such as compressed mode instructions following a function call to the compressed mode, may remain undisturbed (i.e. the alignment bits of addresses of all instructions except for the selected instructions may be of any value, including "00"). With this configuration, exemplary embodiments may switch between execution in the classic mode to execution in the compressed mode, while avoiding drawbacks of tracking and switching between execution modes in conventional approaches.

Figure 2:
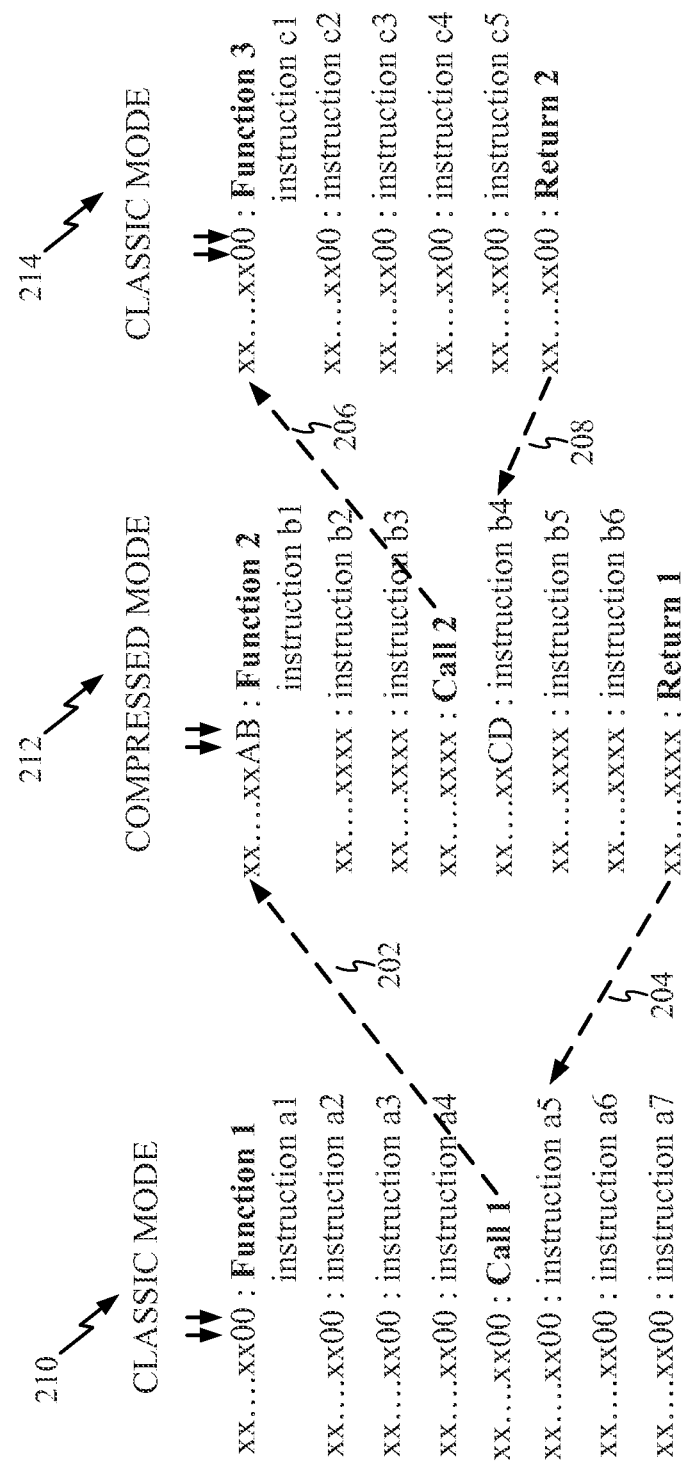
FIG. 2 illustrates exemplary code sequences executed by a processor configured to switch between execution modes according to exemplary embodiments.

With reference now to FIG. 2, exemplary code sequences executed by processor 102 are illustrated. Code sequences 210 and 214 comprise instructions in the classic (aligned) mode, and code sequence 212 comprises instructions in the compressed (unaligned or misaligned) mode. As shown, code sequence 210 comprises Function 1, which begins at instructional a1 and includes instructions a1-a7. The alignment bits of addresses for Function 1 and corresponding instructions a1-a7, as well as the call, Call 1 have been illustrated as "00." Some embodiments may include an optional user status register (or "USR," not explicitly shown), wherein the USR may be configured to provide an indication of the status of the alignment bits. Thus, while the alignment bits are "00" during execution of code sequence 210, the USR may be optionally updated to indicate that the execution is in classic mode. When the call to Function 2, Call 1, is encountered after instruction a4, execution may follow path 202 to Function 2.

With regard to Function 2, this function may begin at instruction b1 and include instructions b1-b6, is in a compressed mode. It is necessary for processor 102 to recognize the switch in execution modes caused by taking path 202, in order to avoid erroneous execution in a wrong execution mode. Thus, Function 2 may be recognized as an entry point to the compressed mode in exemplary embodiments. Recognizing this switch may be accomplished by forcing the two least significant bits (or alignment bits) of the address of Function 2, "AB" to be any value other than "00" For example, the address of Function 2 may be forcibly misaligned in memory 104, such that "AB" is "01," "10," or "11." This forcible misalignment may be accomplished, for example, in a compiler, software, or dedicated logic in processing system 100 (not explicitly shown). In one example, forcibly misaligning Function 2 may be accomplished by configuring the assembler to add a nop before Function 2 along path 202. The size of the nop may be adjusted to ensure that the alignment bits "AB" have a value other than "00." For example, if the alignment bits "AB" are already of a value other than "00" then the assembler may not insert a nop. On the other hand, if the value of "AB" is equal to "00," then the assembler may insert a single one-byte nop, which would adjust the starting address of Function 2 such that "AB" is equal to "01."

Processor 102 may be configured to investigate the alignment bits for every entry point encountered during execution of instructions. Thus, once processor 102 recognizes that the entry point Function 2 has the alignment bits "AB" as a non-zero value, the USR may be optionally updated to indicate that the execution is now in compressed mode. Alignment of instructions b1-b3 may be left undisturbed, and the alignment bits of their corresponding addresses may have any value, including "00."

Thereafter, once the call to Function 3, Call 2, is encountered after instruction b3, execution may follow path 206 to Function 3. Once again, processor 102 may be configured to investigate the alignment address bits of Function 3, because it is an entry point. However, this time, it may be recognized that the alignment bits of the entry point, Function 3, are "00" because Function 3 is in the aligned classic mode. Thus, processor 102 may recognize that execution is back to classic mode for Function 3 which begins at instruction c1 and includes instructions c1-c5. Processor 102 may also optionally update the USR to indicate the return to the classic mode.

Coming now to the return, Return 1, along path 204, from code sequence 212 in the compressed mode to code sequence 210 in the classic mode, processor 102 may investigate the alignment bits of the entry point. In this case the entry point is instruction a5, and thus it may be recognized that the alignment bits of instruction a5 are "00." Thus, it may be concluded that the execution has returned to the classic mode. Correspondingly, the USR may be updated to indicate that the execution is in classic mode.

For the return, Return 2, to instruction b4 along path 208, the entry point will be instruction b4. For ensuring correct operation, processor 102 must be able to recognize that instruction b4 is in the compressed mode. In order to accomplish this, instruction b4 may be forcibly misaligned, such that the alignment bits of instruction h4 are not "00." In one example, forcibly misaligning instruction b4 may be accomplished by configuring the assembler to add a nop before the call, Call 2 to Function 3 along path 206. The size of the nop may be adjusted to ensure that the least significant bits "CD" have a value other than "00." In another example, the size of the call instruction, Call 2 to Function 3 along path 206, may be increased such that the least significant bits "CD" of instruction b4 are forced to a value "01," "10," or "11." Alignment of instructions b5 and b6 is unrestricted and undisturbed. Thus the alignment bits of addresses of instructions b5 and b6 may be any value, including "00."

Figure 4A:
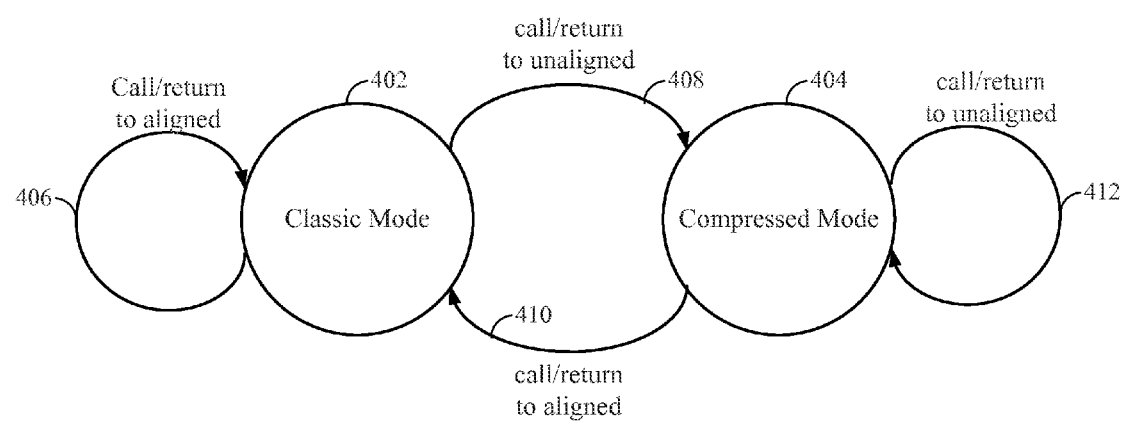
FIGS. 4A-B illustrate schemes for tracking and switching between the execution modes according to exemplary embodiments.

With reference now to FIG. 4A, a generalized scheme for tracking and switching between the classic mode (aligned)

and the compressed mode (unaligned) for calls/returns is illustrated. As shown, calls/returns to aligned addresses may remain in classic mode 402 as shown by loop 406. Calls/returns from classic mode 402 to an unaligned address may transition along path 408 to compressed mode 404. Calls/returns to unaligned addresses may remain in compressed mode 404 as shown by loop 412. Finally, calls/returns from compressed mode 404 to aligned addresses may transition to classic mode 402 along path 410.

While the above embodiments have been described with regard to calls/returns, exemplary techniques may be extended to other such instructions. For example, some embodiments may be extended to monitor mode switches for instructions such as jump, jumpr, callr, dealloc_return, etc, which will be briefly described with reference to FIG. 4B. These instructions may be monitored for mode switches, and thus, execution may be ensured to be in the correct mode, by following similar techniques as described above for calls/returns.

With regard to jump instructions, they may be utilized in one of two different manners with regard to exemplary embodiments. In one example, a jump instruction, when encountered within a function, can be used to jump to an instruction within the function. In another example, a jump instruction may behave as a tail call or "tailcall", which as one of skill in the art will recognize, can be used to perform a call-type behavior. While a call to a function may require a return instruction to return to the location of the call, which can be saved on a call stack, a tailcall may not need the location of a call to be remembered or saved on a stack. On the other hand, a tailcall may directly return to an original caller. Instructions such as a jump may need additional considerations, as will be further explained below.

If a jump instruction is encountered within a function in classic mode, and the behavior of the jump instruction is to jump to an instruction within the function, then there must be no mode change. However, if the jump instruction has a behavior of a type such as a tailcall instruction, then executing the jump instruction may cause the control flow to move to an entry point which may be outside the function. The entry point may lie in either the classic mode or in compressed mode. Therefore, by investigating the least significant bits of the entry point, a determination of whether there needs to be a mode switch can be made. Thus, the behavior of a jump instruction encountered in the classic mode may be similar to that of the call instruction described above.

However, if the jump instruction is encountered within a function which is in the compressed mode, then special considerations may arise. As previously described, in the compressed mode, except for certain entry points which are forcibly misaligned, the remaining instructions may or may not be aligned. In other words, the least significant bits of addresses of the remaining instructions within the function may be any value including "00." Thus, when the jump instruction causes a jump to a target instruction within the function, the address of the target instruction may not have been forcibly misaligned, and thus may be any value. Accordingly, investigating the least significant bits of the address of the target instruction may be insufficient to determine whether a mode switch has occurred, because if least significant bits of the address of the target instruction are "00" this does not indicate that a switch has occurred to a classic mode. In order to handle such situations, embodiments may include special instructions or instructions with special behavior.

One such special behavior may include, in the compressed mode, restricting the behavior of a jump instruction to only jump to instructions which would not cause a mode switch, such as to a target instruction within a same function as the jump instruction; and defining a separate tailcall instruction for situations which may cause a mode change, such as jumping to a target instruction which may be outside the same function and possibly in a different mode. Thus, investigating the least significant bits of the tailcall function can reveal whether a mode change has occurred, and the processor can handle this mode change accordingly.

Accordingly, for instructions such as a jump instruction, determination of whether the execution of the instruction will cause a mode change or not, can be based on the mode within which the instruction is encountered. If the jump instruction is encountered within the classic mode, then the least significant bits of the target address may be used to determine whether a mode change has occurred. On the other hand, if the jump instruction is encountered within the compressed mode, then no mode change will occur or mode changes can be suppressed, regardless of the indications provided by the least significant bits of the target address. Instead, special tailcall instructions may be used in the compressed mode for achieving jump-type behavior which may require mode change, and such mode change may be determined based on the least significant bits of the tailcall instruction. Similarly, in some embodiments, a return instruction may also be restricted to compressed mode, and not used in classic mode.

Other instructions may include jumpr and tailcallr. While a jump and tailcall may specify the address of the target instruction, the jumpr and tailcallr instructions may specify a register which may hold the address of the target instruction. Similarly, a callr instruction may specify a register which may hold the address of the function to be called. A dealloc_return instruction, which may be used to deallocate a register may also be configured such that mode changes related to execution of the dealloc_return instruction may be based on investigating the least significant bits of the target address of the dealloc_return instruction.

Figure 4B:
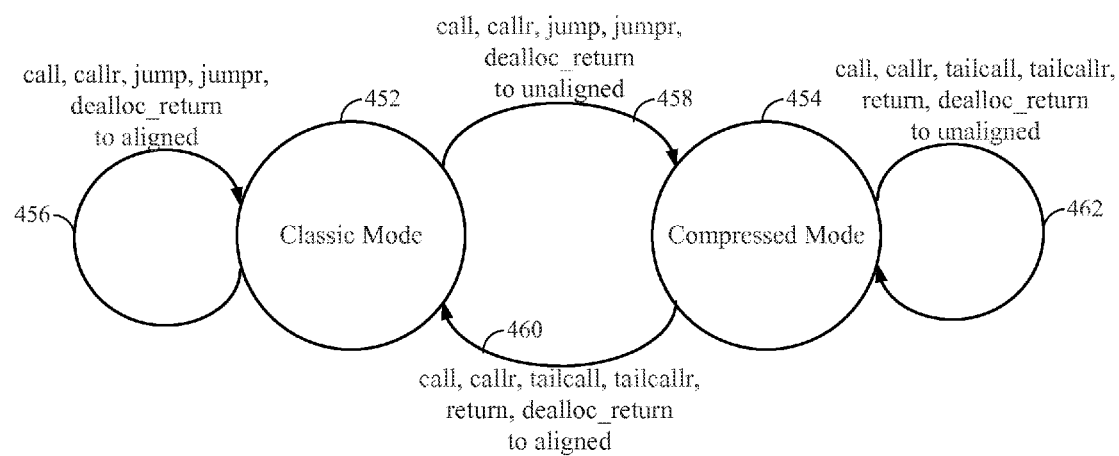

With reference now to FIG. 4B, mode switching behavior and tracking for exemplary instructions including the above special instructions is illustrated. Based on the least significant bits of the address of the target instruction/entry point of called functions, instructions such as call, callr, jump, jumpr, and dealloc_return may remain in classic mode 452 without causing a mode switch, according to loop 456. Alternatively, a mode switch can occur and these instructions, call, callr, jump, jumpr, and dealloc_return, may transition along path 458 to compressed mode 454. From compressed mode 454, instructions such as jump and jumpr will not be tracked for mode switches, as previously described. Instead, tailcall, tailcallr, and return may be tracked. Accordingly, based on the least significant bits of the address of the target instruction/entry point of called functions, instructions such as call, callr, tailcall, tailcallr, return, and dealloc_return may remain in compressed mode 454 according to loop 462. Alternatively, a mode switch can occur, and these instructions, call, callr, tailcall, tailcallr, return, and dealloc_return may transition along path 460 to classic triode 452.

In some exemplary embodiments, only selected instructions such as the entry points to functions in the compressed mode may be forcibly misaligned, and the addresses of remaining instructions in the compressed mode may be left undisturbed. Thus, in contrast to existing approaches, such as the ARM processor in the THUMB mode, the need for using the LSB to hold an indication of the mode or to jump to the PC value of the called function +1 is eliminated. As discussed above, in exemplary embodiments, the USR may be configured to efficiently provide an indication of the execution mode. Moreover, only instructions of the types, Call 1 to Function 2 along path 202 and Return 2 to instruction b4 along path 208 may require a nop to be inserted, while instructions such as Return 1 to instruction a5 along 204 and Call 2 to Function 3 along path 206 would not require such nops. Accordingly, only two of the four types of call/return instructions may require misalignment by the introduction of nop, which means that wastage of code space by introduction of nops is reduced.

Moreover, in exemplary embodiments, the addresses of instructions may themselves be conveniently used to recognize the execution mode for function calls and returns, without requiring any complex code or expensive tracking mechanisms. For all other instructions, the USR may be configured to efficiently provide an indication of the execution mode. Because exemplary embodiments avoid the need for a reserved bit to indicate execution mode, the embodiments correspondingly avoid drawbacks associated with restricting addresses of instructions following entry points to functions. Further, using the value of the address to determine the execution mode requires investigation of the address bits only on calls or returns. Thus, there is no need to know ahead of time, what the mode associated with a target instruction is. Additionally, in exemplary embodiments, MMU page table entries do not need to hold information regarding execution modes of instructions. Therefore there is no requirement for an MMU (not shown) in processing system 100 to switch operation or perform special functions when execution switches between the compressed mode and the classic mode, or vice-versa.

Figure 3:
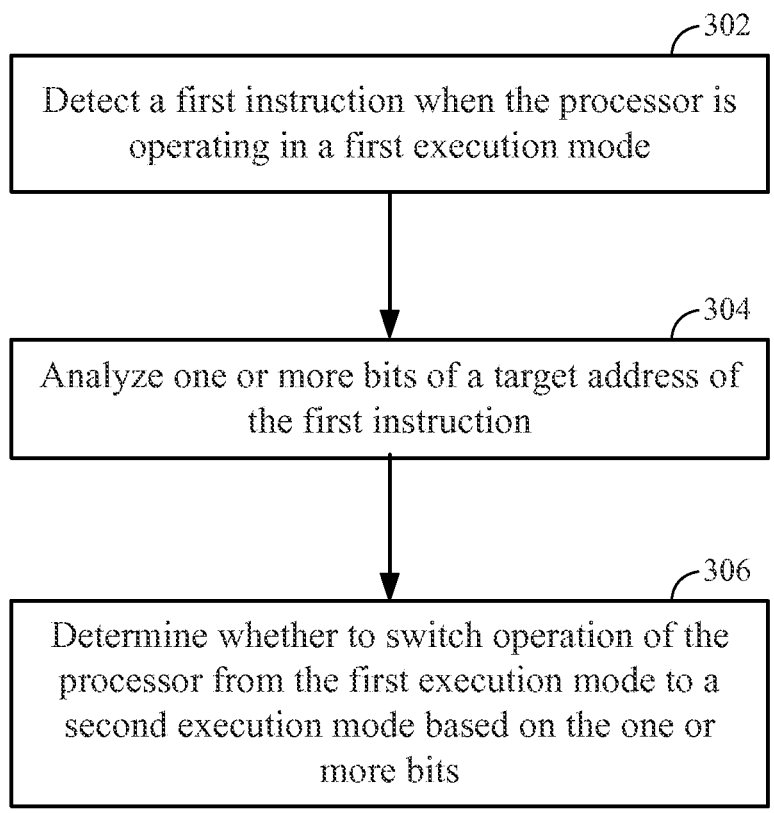
FIG. 3 illustrates an operational flow of a method for switching between execution modes according to exemplary embodiments.

It will be appreciated that embodiments include various methods for performing the processes, functions and/or algorithms disclosed herein. For example, as illustrated in FIG. 3, an embodiment can include a method of switching between execution modes in a processor (e.g. processor 102) comprising: detecting a first instruction (e.g. a call/return instruction with a target instruction/entry point such as Function 2/instruction a5 respectively in FIG. 2) when the processor is operating in a first execution mode (e.g. classic mode)—Block 302; analyzing one or more bits of a target address of the first instruction (e.g. two least significant bits or alignment bits "AB"/"00" for Function 2/instruction a5 respectively in FIG. 2)—Block 304; and determining whether to switch operation of the processor from the first execution mode to a second execution mode (e.g. compressed mode) based on the one or more bits—Block 306.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the aid will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Figure 5:
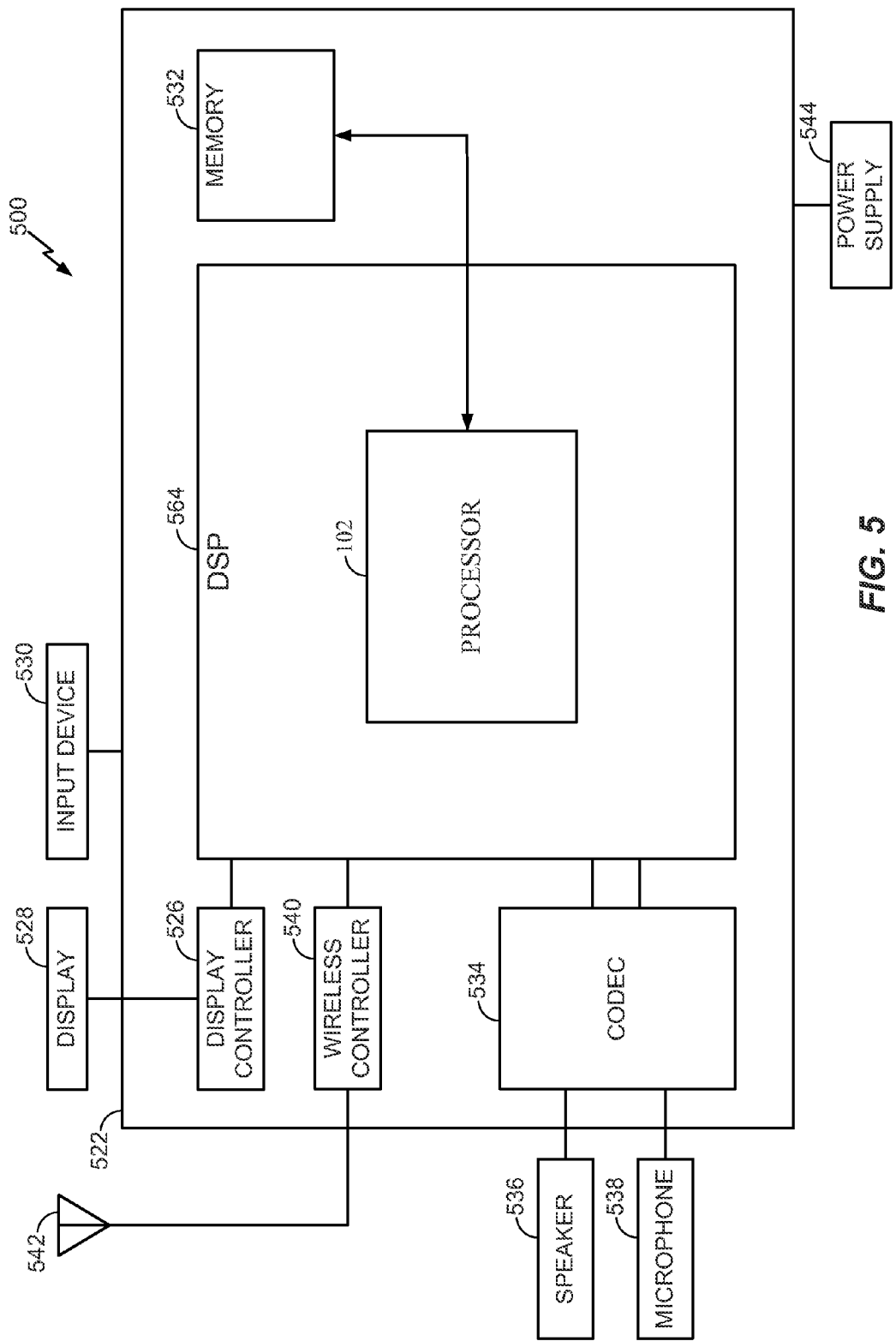
FIG. 5 illustrates an exemplary wireless communication system 500 in which an embodiment of the disclosure may be advantageously employed.

Referring to FIG. 5, a block diagram of a particular illustrative embodiment of a wireless device that includes a multi-core processor configured according to exemplary embodiments is depicted and generally designated 500. The device 500 includes a digital signal processor (DSP) 564, which may include processor 102 of FIG. 1 coupled to memory 532 as shown. FIG. 5 also shows display controller 526 that is coupled to DSP 564 and to display 528. Coder/decoder (CODEC) 534 (e.g., an audio and/or voice CODEC) can be coupled to DSP 564. Other components, such as wireless controller 540 (which may include a modem) are also illustrated. Speaker 536 and microphone 538 can be coupled to CODEC 534. FIG. 5 also indicates that wireless controller 540 can be coupled to wireless antenna 542. In a particular embodiment, DSP 564, display controller 526, memory 532, CODEC 534, and wireless controller 540 are included in a system-in-package or system-on-chip device 522.

In a particular embodiment, input device 530 and power supply 544 are coupled to the system-on-chip device 522. Moreover, in a particular embodiment, as illustrated in FIG. 5, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 depicts a wireless communications device, DSP 564 and memory 532 may also be integrated into a set-top box, a music player, a video player, an entertainment unit, a navigation device, a personal digital assistant (PDA), a fixed location data unit, or a computer. A processor (e.g., DSP 564) may also be integrated into such a device.

Accordingly, an embodiment of the invention can include a computer readable media embodying a method for switching between execution modes in a processor. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of switching between execution modes in a processor, the method comprising:
   detecting a first instruction when the processor is operating in a first execution mode;
   analyzing one or more bits of a target address of the first instruction; and
   determining whether to switch operation of the processor from the first execution mode to a second execution mode based on the one or more bits, wherein the one or more bits are alignment bits, and wherein the alignment bits are forcibly misaligned for the target address in one of the first execution mode or the second execution mode.

2. The method of claim 1, wherein the alignment bits of the target address in the first execution mode are different from the alignment bits of the target address in the second execution mode.

3. The method of claim 2, wherein:
   the first execution mode is a classic mode comprising instructions which are aligned in a memory coupled to the processor; and
   the second execution mode is a compressed mode comprising instructions which are unaligned in the memory.

4. The method of claim 3, wherein the alignment bits are two least significant bits of the target address, and wherein the target address in the classic mode is aligned to 32-bit boundaries of the memory, such that the alignment bits are "00"; and wherein the target address in the compressed mode is misaligned with respect to 32-bit boundaries of the memory, such that the corresponding alignment bits are one of "01," "10," or "11".

5. The method of claim 2, wherein:
   the first execution mode is a compressed mode comprising instructions which are unaligned in a memory coupled to the processor; and
   the second execution mode is a classic mode comprising instructions which are aligned in the memory.

6. The method of claim 5, wherein the alignment bits are two least significant bits of the target address, and wherein the target address in the classic mode is aligned to 32-bit boundaries of the memory, such that the alignment bits are "00"; and wherein the target address in the compressed mode is misaligned with respect to 32-bit boundaries of the memory, such that the corresponding alignment bits are one of "01," "10," or "11".

7. The method of claim 1, wherein the first instruction is one of a call or return instruction.

8. The method of claim 1, wherein the first instruction is one of a call, callr, dealloc_return, tailcall, or tailcallr instruction.

9. The method of claim 1, wherein the first instruction is one of a jump or jumpr instruction and the first execution mode is a compressed mode, and wherein switching operation of the processor from the first execution mode to the second execution mode is suppressed.

10. The method of claim 1, wherein the first instruction is one of a jump or jumpr instruction and the first execution mode is a classic mode, and wherein switching operation of the processor from the first execution mode to the second execution mode is not suppressed.

11. The method of claim 2, further comprising providing an indication of a status of the alignment bits in a user status register.

12. An apparatus comprising:
   a processor configured to:
      execute instructions in at least two execution modes including a first execution mode and a second execution mode;
      detect a first instruction during execution in the first execution mode;
      analyze one or more bits of a target address of the first instruction; and
      determine whether to switch operation of the processor from the first execution mode to the second execution mode based on the one or more bits,
      wherein the one or more bits are alignment bits, and wherein the alignment bits are forcibly misaligned for the target address in the first execution mode or the second execution mode.

13. The apparatus of claim 12, wherein the alignment bits of the target address in the first execution mode are different from the alignment bits of the target address in the second execution mode.

14. The apparatus of claim 13, wherein:
   the first execution mode is a classic mode comprising instructions which are aligned in a memory coupled to the processor; and
   the second execution mode is a compressed mode comprising instructions which are unaligned in the memory.

15. The apparatus of claim 14, wherein the alignment bits are two least significant bits of the target address, and wherein the target address in the classic mode is aligned to 32-bit boundaries of the memory, such that the alignment bits are "00"; and wherein the target address in the compressed mode is misaligned with respect to 32-bit boundaries of the memory, such that the corresponding alignment bits are one of "01," "10," or "11".

16. The apparatus of claim 13, wherein:
   the first execution mode is a compressed mode comprising instructions which are unaligned in a memory coupled to the processor; and
   the second execution mode is a classic mode comprising instructions which are aligned in the memory.

17. The apparatus of claim 16, wherein the alignment bits are two least significant bits of the target address, and wherein the target address in the classic mode is aligned to 32-bit boundaries of the memory, such that the alignment bits are "00"; and wherein the target address in the compressed mode is misaligned with respect to 32-bit boundaries of the memory, such that the corresponding alignment bits are one of "01," "10," or "11".

18. The apparatus of claim 13, wherein the first instruction is one of a call, callr, return, dealloc_return, tailcall or tailcallr instruction.

19. The apparatus of claim 13, further comprising a user status register configured to provide an indication of a status of the alignment bits.

20. The apparatus of claim 12, integrated in at least one semiconductor die.

21. The apparatus of claim 12, integrated into a device, selected from the group consisting of a set top box, music player, video player, entertainment unit, navigation device, communications device, personal digital assistant (PDA), fixed location data unit, and a computer.

22. A processing system comprising:
   means for executing instructions in at least two execution modes including a first execution mode and a second execution mode;
   means for detecting a first instruction during execution in the first execution mode;

means for analyzing one or more bits of a target address of the first instruction; and means for determining whether to switch operation of the means for executing instructions, from the first execution mode to the second execution mode based on the one or more bits, wherein the one or more bits are alignment bits, and wherein the alignment bits are forcibly misaligned for the target address in the first execution mode or the second execution mode.

23. A non-transitory computer-readable storage medium comprising code, which, when executed by a processor, causes the processor to perform operations for switching between execution modes of the processor, the code comprising:

code for detecting a first instruction when the processor is operating in a first execution mode;

code for analyzing one or more bits a target address of the first instruction; and code for determining whether to switch operation of the processor from the first execution mode to a second execution mode based on the one or more bits, wherein the one or more bits are alignment bits, and wherein the alignment bits are forcibly misaligned for the target address in the first execution mode or the second execution mode.

* * * * *